Feb. 24, 1959 T. FOSTER 2,874,595
POWER TURRET INDEXING
Filed April 2, 1956 3 Sheets-Sheet 3

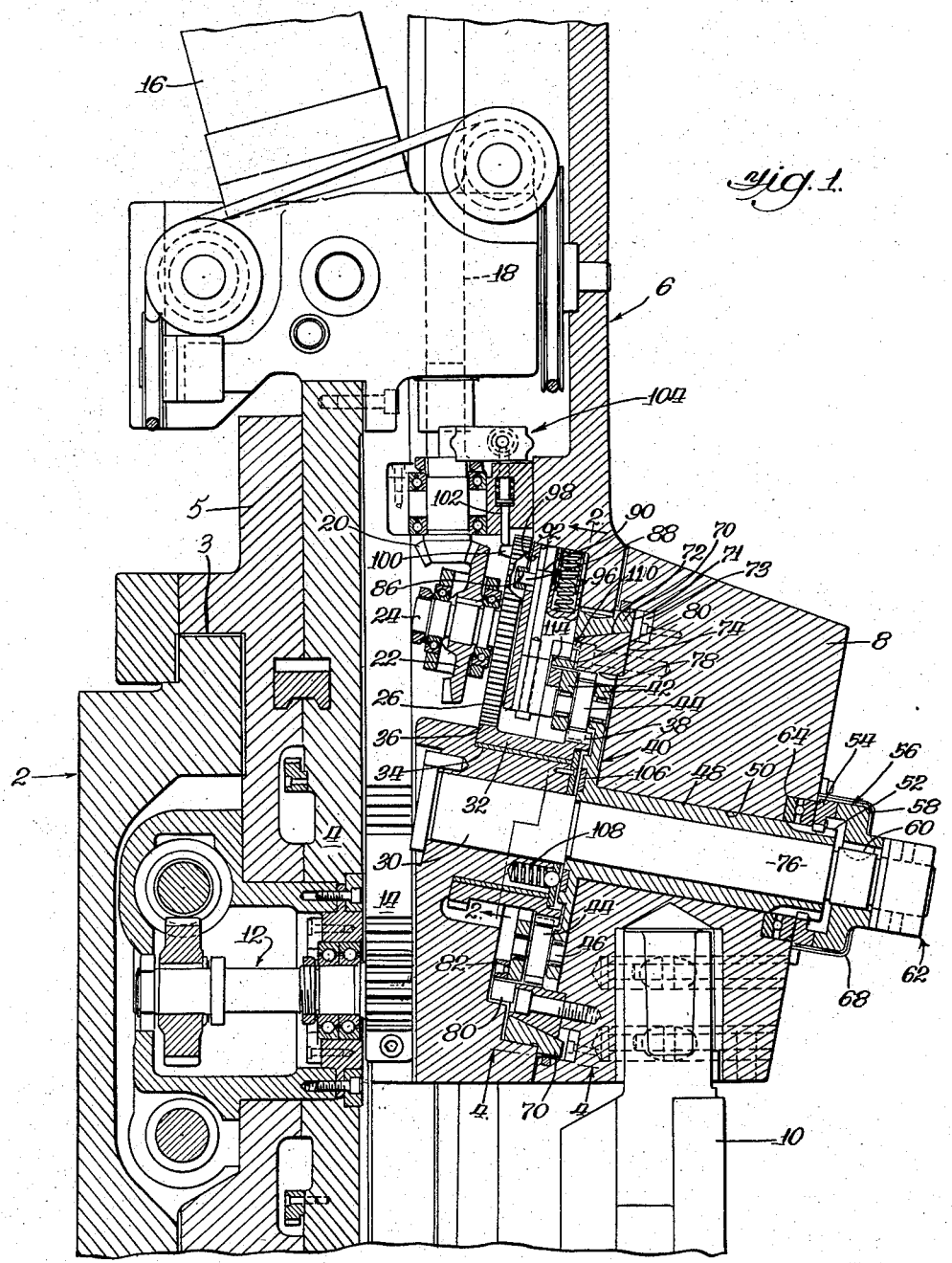

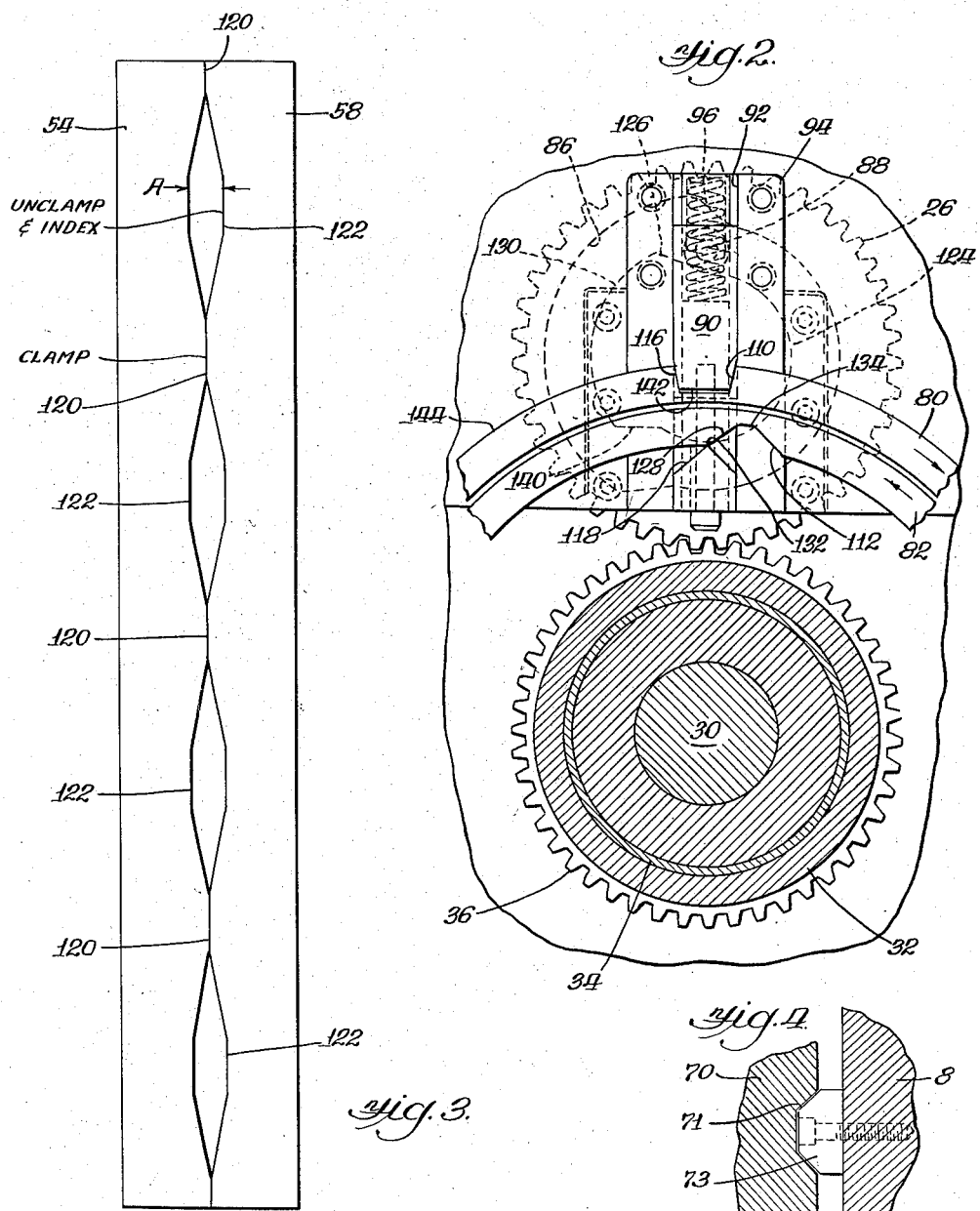

INVENTOR.
Theodore Foster
BY Walter L. Schlegel, Jr.

United States Patent Office 2,874,595
Patented Feb. 24, 1959

2,874,595
POWER TURRET INDEXING

Theodore Foster, Cincinnati, Ohio, assignor to American Steel Foundries, Chicago, Ill., a corporation of New Jersey Application April 2, 1956, Serial No. 575,381

14 Claims. (Cl. 74—822)

The invention relates to metal cutting machines and particularly to an arrangement whereby a multiple tool holding turret may be power indexed, and is a continuation-in-part of my application bearing Serial No. 487,750, filed February 14, 1955.

In the art of metal turning and particularly that type of metal turning performed on a vertical boring mill, it has been found advisable to provide the machine with an indexing turret, said turret offering mounting for a plurality of metal cutting tools which may be selectively indexed into cutting position whereby a plurality of sequential machining operations may be easily and quickly accomplished.

In the vertical boring mill a generally flat rotating work table is provided, said table offering mounting means for a work piece which is to be machined. Upstanding from the table and on opposite sides thereof, the machine is provided with a pair of substantially parallel columns, said columns offering mounting for a generally horizontal rail which may be moved vertically on the columns toward and away from the work table. The rail in turn may be provided with a head which is secured to the rail for horizontal movement along suitable ways provided on the rail. The head may be either one of two types, that is, a ram head or a turret type head. We are here concerned primarily with the turret type head. The turret head is arranged with a turret thereon, said turret mounting a plurality of tools which may be indexed on a substantially horizontal axis whereby the tools may be selectively brought into work piece engaging position. The turrets, particularly on the larger type boring mills, are extremely heavy and bulky requiring an excessive amount of manual labor to index. It is even difficult to index the turret where manually operated mechanically advantageous means are provided on the turret to accomplish the indexing.

Accordingly, it is an object of this invention to provide a convenient power means whereby a multiple tool holding turret of a cutting machine may be readily indexed into any one of a plurality of selectable positions.

It is a particular object of the invention to provide a tool holding turret of the type described with convenient power means to easily accomplish the indexing.

It is a specific object of the invention to provide novel gear-cam arrangements which facilitate accurate turret indexing and turret locking.

It is another object of this invention to provide means for accurate repetitive positioning of the turret in each of the turret indexing positions.

These and other objects of the invention will become apparent in the course of the following description and from an examination of the concerned drawings, wherein:

Figure 1 is a side elevational view, partially fragmentary, of a turret head for a vertical boring mill;

Figure 2 is a fragmentary view taken along line 2—2 of Figure 1;

Figure 3 is a schematic view of a cam arrangement utilized in the clamping and unclamping operation of the turret;

Figure 4 is a section taken substantially at line 4—4 of Figure 1;

Figures 5, 6:
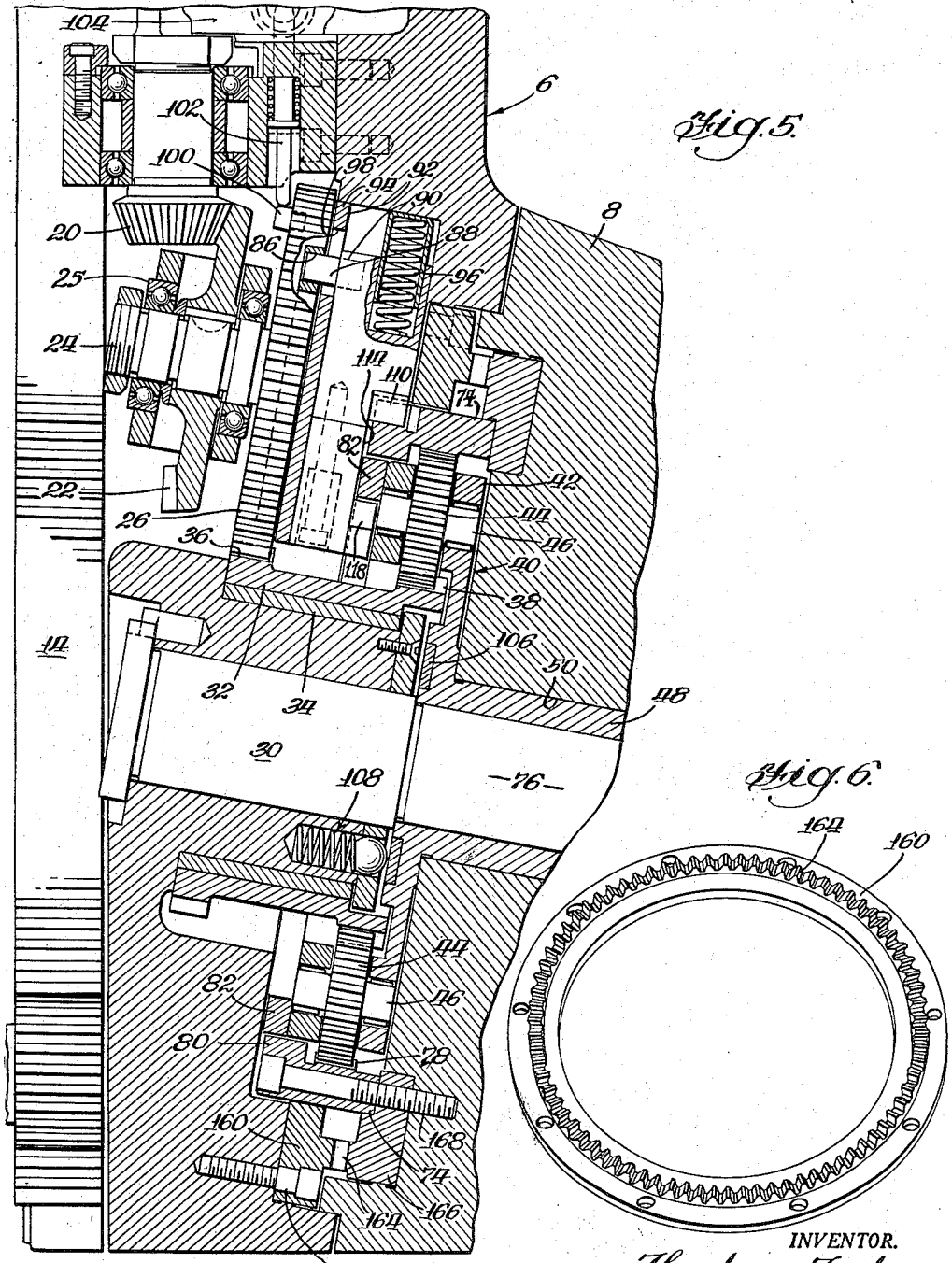
Figure 5 is an enlarged fragmentary side elevational view illustrating more clearly the indexing mechanism of Figure 1 but incorporating an alternate form of turret locating means.
Figure 6 is a perspective view of one member of the turret locating means shown in Figure 5.

It will be noted that the drawings disclose a turret and power arrangement for use on a vertical boring mill, the mill itself, the mounting arrangement of the turret on the rail and the mill rail being illustrated only fragmentarily in view of the fact that such arrangements are conventional and certainly are familiar to those skilled in the art.

Describing the invention in detail, the turret head generally comprises a saddle section 5, said saddle section being mounted on guideways 3 on the horizontal rail 2 for movement therealong in a generally horizontal direction whereby the entire head is so moved with the saddle section 5. The head is provided with a swivel section 4, said swivel section being pivotally mounted on the saddle section to rotate thereon about a generally horizontal axis as will be well understood by those skilled in the art. The swivel section 4 guidably carries a slide or turret holding member indicated generally at 6, said turret holding member being movable in a generally vertical direction on the swivel section 4 whereby the turret and carried tools may be raised or lowered relative to the surface of the work table (not shown). The turret holding member 6 is provided with a turret 8, said turret 8 being pivotally mounted, as will be hereinafter explained in detail, on the member 6 and arranged to carry a plurality of tool holding members, one of which is indicated at 10. This arrangement is generally conventional and is familiar to those skilled in the art.

A power take off arrangement is indicated generally at 12, said arrangement 12 being engageable with a rack 14 on the member 6 whereby the member 6 may be driven in the aforementioned vertical direction.

Considering the details of the herein disclosed invention, it will be seen that the swivel 4 has mounted thereon adjacent its upper extremity a torque motor 16, said torque motor 16 affording power to accomplish the turret indexing hereinafter described. The motor 16 is arranged to mechanically drive (not shown) a power shaft indicated at 18, said power shaft being arranged in a generally vertical direction and bearing mounted in the turret holding member 6 and carrying on its lower end thereof a bevel gear 20 (Figures 1 and 5). The bevel gear 20 is in geared engagement with another bevel gear 22, said gear 22 being keyed to a drive shaft 24 which in turn is bearing mounted at 25 for rotation in the member 6. The shaft 24 has on its outer extremity a timing gear 26, said timing gear being keyed to the shaft 24 for rotation therewith.

A fixed or main shaft 30 is mounted in the member 6, said shaft 30 extending forwardly of the member 6 to provide means to mount the turret 8 and associated mechanisms. A sun gear 32 surrounds the shaft 30 and is rotatably mounted in the member 6 by means of a sleeved bearing 34, the sun gear 32 having a circular gear 36 formed on one end thereof and in geared engagement with the timing gear 26. The other end of the sun gear 32 is provided with a circular gear 38, and it will be noted that the gears 36 and 38 are preferably of the same pitch and the same number of teeth. It will also be noted that the timing gear, which drives the sun gear 32, is preferably arranged to drive the sun gear with a one to one ratio, that is, the timing gear is of the same pitch and provided with the same number of teeth as the gear 36 on the sun gear 32.

A spider is indicated generally at 40, said spider having a flange section 42 which peripherally carries a plurality of planet gears 44, 44, said planet gears each being mounted on shafts 46, 46 for rotary movement within the flange 42 of the spider 40. Projecting forwardly from the flange 42, the spider is provided with a spider sleeve 48, said spider sleeve being rotatably mounted on the front portion of the supporting shaft 30 and being received within an aperture 50 of the turret 8. The forward end of the sleeve 48 is splined as at 52 (Figure 1) whereby said sleeve is in geared engagement with a rotary portion 54 of the clamp-unclamp cam indicated generally at 56. A nonrotary or fixed portion 58 of the clamp-unclamp cam 56 is fixedly keyed to the outboard extremity of the shaft 30 as at 60 and is held in position by a conventional locking nut arrangement indicated generally at 62. A thrust bearing 64 is provided in the head 8 to accommodate the rotation of the rotary portion 54, as will be hereinafter more fully described. A cap 68 is conventionally bolted on the front face of the turret 8 to surround and protect the clamp-unclamp cam arrangement 56.

The rear face of the turret is provided with a cavity which receives a machined cup 70, said cup 70 being secured to the member 6. The cup 70 is provided with a tapered surface 72, said tapered surface 72 being complementally engageable with a similar surface formed on a ring gear 74, said ring gear 74 being conventionally bolted to the turret 8 in the before-mentioned cavity. The surface 72 and the complementary surface on the ring gear 74 are finely machined to provide accurate engagement therebetween whereby the turret 8 may be accurately relocated about its pivotal axis 76 (Figure 1) when moved to clamped position under the action hereinafter described. It will also be noted that the cup 70 is provided with a plurality of key slots 71 (Figures 1 and 4) arranged peripherally about the cup 70 with their axes aligned with radii from the axis 76. The member 8 is provided with one or more keys 73 which may be received within the slots 71 when the turret is in the clamped position to accurately locate the turret in the clamped position and proper tool working engagement. The ring gear 74 is provided with an internally formed peripherally arranged circular gear 78, said gear 78 being operatively engaged with the plurality of planet gears 44 which surround the sun gear 32. Additionally, the ring gear 74 has a locking ring 80 fixedly bolted thereto, said locking ring 80 serves as a preliminary positioning arrangement to locate the turret in its various indexed positions, as will be hereinafter more fully described. A cam-like spider ring 82 is fixedly bolted to the rear face of the flange 42 of the spider 40 whereby said spider ring will be carried with the spider as the spider is rotated under the action hereinafter described.

Directing attention to the timing gear 26, it will be seen that the timing gear is provided with a machined cam slot 86 formed in the front face thereof. The slot 86 is engaged by a follower pin 88 which is fixedly attached to the rear face of a locating member 90. The locating member 90 is received in a guiding slot 92 formed in a guiding member 94 (Figure 2) which is rigidly secured or mounted on the member 6. Thus it will be seen that the locating member 90 is vertically reciprocal within the slot 92 and is provided with an abutting spring 96 which exerts a pressure on the locating member 90 to urge it in a downward direction. The member 94 is provided with an opening 98 in its rear wall which accommodates the pin 88 whereby the pin 88 may register itself with the cam slot 86. The rear face of the timing gear 26 is provided with a lug 100, said lug being engageable with a vertically movable actuating member 102, which serves, upon engagement with the lug 100, to open a limit switch arrangement indicated generally at 104, which in turn provides a circuit break to interrupt the power and to stop the torque motor 16.

It will be noted that the inboard face of the spider 40 is provided with a hardened circular insert ring 106, said ring being engageable by a spring loaded ejector mechanism 108 which will urge turret 8 and the spider 40 outwardly to the unclamped position under the action hereinafter described.

Directing attention to the locking ring 80, it will be seen that it is provided with a plurality of locating slots, one of which is indicated at 110. Additionally, the spider ring 82 is provided with a plurality of receiving slots, one of which is indicated at 112 (Figure 2). The locating member 90 is provided with a slot 114 and defines on its upper and lower extremities, a turret locking lug 116 and a spider locking lug 118. The turret locking lug 116 is receivable within the slots 110 of the locking ring 80, and the spider locking lug 118 is receivable in the slots 112 of the spider ring 82. It should be noted that the number of slots 110 and 112 provided in the turret ring 80 and the spider ring 82 is dependent on the number of tool stations or indexing stations provided on the turret 8.

Describing the operation of the above disclosed power indexing arrangement, it will be understood that indexing may be initiated by the operator by actuating an appropriate control switch (not shown) which will energize the torque motor 16 whereby the power is transmitted to the shaft 18 causing the gear 22 to be rotated whereby rotation of the timing gear 26 ensues. It should be also noted that the turret is illustrated in clamped position with one of the selected tools engaging the work piece. As it becomes desirable to rotate the turret for indexing, it is necessary for the arrangement illustrated to proceed through the following cycle, namely, unclamp, index, and clamp. With this in mind, it will be seen that rotation of the sun gear 32 induces rotary action in the plant gears 44 through the engagement therewith with gear 38. In the clamped position illustrated, the locking lug 116 is firmly received in a slot 110 formed in the locking ring 80, said ring 80 being fixedly secured through the ring gear 74 to the turret 8 and thus prohibiting rotation of the turret. With the turret in a fixed or locked position, the action of the planet gears 44 is translated into rotary action of the spider 40 due to the fact that the planetary gear shafts 46 are mounted in the flange 42 of the spider 40. This rotary action of the spider induces a corresponding rotary action of the cam portion 54 of the clamp and unclamp cam 56. Directing attention to Figure 3 which illustrates diagrammatically the arrangements of the portions 54 and 58 of the clamping cam, it will be seen that rotary motion of the portion 54 will move the high lands 120 of said rotary portion into registration with the low lands 122 of the fixed portion 58. When this occurs, the turret is allowed to move forwardly, the distance of the forward motion being equal to one half the distance indicated at "A" in Figure 3 which is the distance available between the two low lands of the cam mechanism 56. With the high lands 120 and the low lands 122 registered, the ejector mechanism 108 forces the spider and engaged turret 8 outwardly to take up this play in the arrangement. This forces the turret and attached turret ring gear 78 to move from the cup 70 at the surface 72, thereby releasing keys 73 from slots 71. At this point the unclamping portion of the indexing cycle is completed.

As earlier noted, the unclamping action was induced by the rotation of the timing gear 26 and a corresponding action carried throughout the entire arrangement. The unclamping action is accomplished while the pin 88 is in a low portion of the cam slot 86, shown in Figure 2 at 124. As the unclamping cycle is completed, the pin 88 approaches the rise 126 of the cam slot 86. Upon engagement of the pin 88 with the rise 126, the locating member 90 is urged to move upwardly as seen in Figure 2 against the pressure of the spring 96. At this point the lower locking member 118 is just approaching fall 128 of the slot 112 in the spider ring 82. This fall in the spider ring 82 accommodates vertical movement of the locating member 90 whereby the upper locking lug 116 is gently withdrawn from the slot 110 in the locking ring 80. The withdrawal of the lug 116 is completed the moment that the pin 88 reaches the high side 130 of the cam 86 at which point the apex 132 of the lower locking lug 118 strikes the flat 134 at the bottom of the slot 112. It will be noted that the flat 134 is provided in the slot 112 to accommodate a slight lag in the change of gear action, as hereinafter described. This is due to the physical impossibility of having virtually instantaneous change in the later described gear action especially where the train must overcome the inertia of the turret. As the timing gear 26 continues to rotate, the spider member 40 and connected spider ring 82 are urged to rotate a little more, even though the locking lug 116 is now completely withdrawn from the locking ring 80. This lag occurs due to the mentioned flat 134. At the end of this lag, one side of the locking lug 118 strikes the right side of the slot 112 and prevents further rotation of the spider ring 82 and the connected spider 40. However, the timing gear 26 continues its rotary motion under the action of the torque motor 16 which continues the rotation of the sun gear 32. The rotation of the sun gear 32 is of course transmitted to the planet gears 44, it being noted that the gear 38 on the sun gear is wider than the engaged planet gears 44, thus allowing for continued engagement therebetween, even though the turret is in the forward or unclamped position. The continued action of the planet gears 44 must be taken up inasmuch as they are now stationary relative to rotary motion about the axis 76. However, inasmuch as the locking lug 116 is not in engagement with the slot 110 in the turret connected locking ring 80, the turret and ring gear 74 are free to rotate under the action of the connected planet gears 44. Thus the rotary action or indexing motion of the turret is initiated. This rotary action continues as long as the pin 88 rides the high portion 130 of the cam slot 86. As the pin 88 approaches the fall 140 in the cam 86, the locating member 90 approaches the next slot 110 formed in the locking ring 80. It will be remembered that the spring 96 is exerting a downward pressure on the locating member 90, hence the fall 140 may be provided on the cam surface at a rotary position to slightly anticipate or precede the actual registering of the lug 116 with the next slot 110. Thus the spring 96 causes the bottom surface 142 of the locking lug 116 to ride the peripheral surface 144 of the locking ring 80, and this engagement maintains the locating member 90 in unlocked position, even though the pin 88 has passed the beginning of the fall 140 in the cam 86. At a point when the locating member 90 and particularly the locking lug 116 is completely registered with the next slot 110, the spring 96 urges the locating member 90 to slam downwardly and quickly lock the ring 80 against further rotation. This action obviously immediately disengages the lower locking lug 118 from its registration with the slot 112 provided in the spider ring 82 whereby the continued motion of the timing gear 26 and engaged sun gear 32 may be taken up by rotation of the spider 40 much as was done in the unclamping operation heretofore described. Rotation of the spider 40 causes a rotation of the rotary portion 54 of the clamp-unclamp cam 56 which again causes the high lands 120 of the cam portions 54 and 58 to re-register forcing the turret member 8 and associated parts inwardly of the head into clamped or locked position. This inward motion again causes the keys 73 to register with the slots 71 in the cup 70 whereby the turret 8 is accurately located.

As the portions 54 and 58 and the high lands become exactly registered in the clamped position, the timing gear 26 is just completing one full rotation whereby the lug 100 is urged to engage the member 102, forcing it upwardly and actuating the limit switch arrangement 104 which in turn breaks the power circuit to the torque motor 16 whereby indexing action is completed.

Figures 5 and 6 illustrate an alternative embodiment of the device, wherein parts corresponding to those of Figures 1–4 are identified by corresponding numerals. The locating means illustrated in these figures are particularly adapted for repetitive indexing of the turret through successive positions with extreme accuracy.

Referring to Figure 5, it is seen that the machined cup 70 is replaced by a coupler member 160 in the form of an annular ring secured to the slide 6 by a plurality of cap screws 162. The coupler member 160 is provided on its outer face with a plurality of annularly arranged teeth 164 which are engageable with the teeth on the inner face of a coupler member 166 also in the form of an annular ring which is secured to the turret 8 by means of a plurality of cap screws 168. The coupler member 160 is illustrated more clearly in Figure 6.

It should be noted that the key slot 71 and the keys 73 (both of which are shown in Figure 1) are eliminated in the modification shown in Figure 5, and it should be noted also that the locking ring 80 is formed integrally with the ring gear 74. The various gear trains for clamping, indexing and unclamping the turret relative to the base are identical with those of Figure 1, and their manner of operation may be seen more clearly in Figure 5.

The teeth of the coupler members 160 and 166 are ground to extremely close tolerances so that as the turret indexes through repetitive cycles such as would occur when the boring mill were being utilized in a production like making identical parts, each tool carried by the turret would be returned to the precise position it had occupied on the preceding cycle. The number of teeth on the coupler members is critical only in that it must be divisible by the number of index stations on the turret thereby assuring proper registration of the teeth in each of the turret positions. The mutually engageable teeth of the coupler members also accomplish positive locking of the turret against rotation about the axis 76 when the turret is in the clamped position.

Describing the operation of Figures 5 and 6, the operator actuates a switch (not shown) to energize the torque motor 16 (Figure 1) whereupon pinion gear 20 is rotated thereby. Under these conditions locking lug 116 is received within the related notch 110 of locking ring 80, whereby motion of timing gear 26 and sun gear 32 causes rotation of spider 40 to release teeth 164 and also to unclamp the turret as previously described in connection with Figures 1–4. As follower pin 88 rides up on the rise 126 of cam slot 86, locking member 118 moves into notch 112 of spider ring 82, thereby transmitting a force to ring gear 74 through planet gears 44 tending to rotate the ring gear 74. As in the previously described embodiment, notch 112 is provided wtih a flat 134 (Figure 2) accommodating momentary lag in the rotation of ring gear 74 due to friction and intertia. When locking lug 118 strikes the right side of slot 112 as shown in Figure 2, the ring gear 74 has already started to rotate, to index the turret 8.

Before locking lug 116 reaches the next notch 110 in locking ring 80, the follower pin 88 has passed the fall 140 of cam slot 86, whereby spring 96 snaps lug 116 into the next notch 110 holding the turret in the next indexed position thereof and causing lug 118 to drop out of its notch 112 accommodating reclamping of the turret by rotation of spider 40 under the action of sun gear 32 and planet gears 44 as described in connection with Figures 1–4.

It may be noted that in the arrangement of Figures 5 and 6, as the turret is clamped by mechanism 56, the teeth 164 of rings 160 and 166 move the turret 8 to an extremely accurate indexed position.

Thus it will be seen from the above described structure and its operation that I have provided a novel and unique arrangement which provides power means to accurately index a multiple tool holding turret to any one of a plurality of positions, the number of positions being dependent entirely upon a particular turret design and, it being understood that the invention is readily adaptable to turrets accommodating a large variety of tool holding positions.

I claim:

1. In a power indexing arrangement for use in association with a tool holding turret on a vertical boring mill, the combination of a member, a pivot extending from the member, a turret rotatably mounted on the pivot, and means to index said turret to and through a plurality of stations, said means comprising a power source, a timing gear, transmission means for transmitting power from the source to the timing gear, a planetary gear arrangement operatively driven by the timing gear during an indexing cycle, locating means to locate the turret in a fixed position, said planetary arrangement being operatively associated with the turret and the locating means whereby power induced action of said planetary arrangement is operative to unclamp the turret, then index the turret to a new position, and then clamp and hold the turret.

2. In a power indexing arrangement for use in association with a multiple tool holding turret on a vertical boring mill, the combination of a slide member, a torque motor, a rotatable timing gear, gear means interconnecting the motor and the timing gear to rotate the latter, a shaft mounted on the member, a spider rotatably mounted on the shaft, a turret rotatably mounted on the spider, a sun gear mounted to rotate about the axis of the shaft, said sun gear being in geared engagement with the timing gear, a plurality of planetary gears rotatably carried by the spider and in geared engagement with the sun gear, a ring gear fixedly mounted on the turret and in geared engagement with the planetary gears, a ring on the turret having a plurality of station slots therein, a spider ring on the spider having a plurality of slots therein, a movable member having detents operative to selectively and respectively engage the slots on the first mentioned ring and the slots on the spider ring, cam means rotatable with the timing gear and operatively engageable with the movable member to alternately accommodate engagement of the detents with the respective slots, and means to clamp and unclamp the turret, said combination being formed and arranged to unclamp the turret and then index the turret to a new station and then clamp the turret.

3. A power indexing arrangement according to claim 2, wherein said last mentioned means comprises a cam arrangement having a fixed cam member and rotary cam member, the fixed member being nonrotatably mounted on the shaft and the rotary cam member being connected to the spider for rotary movement therewith, the cam members having opposed high lands and low lands which alternately register in response to movement of the spider, and ejector means operative to move the turret linearly to the unclamped position when the high and low lands on the respective cam members are properly aligned.

4. A power indexing arrangement according to claim 2, and including a cone shaped surface on the turret and a cup shaped surface on the base complementally engageable with said cone shaped surface when the turret is moved to clamped position, and key and slot means on the base and turret to accurately position the turret in clamped position.

5. A power indexing arrangement according to claim 2, and including a lug on the timing gear, a movable motor actuating member engageable by said lug upon a determined rotation of the timing gear, said actuating member being operatively connected to said torque motor to de-energize said motor upon engagement of the lug and the actuating member.

6. A power indexing arrangement according to claim 2, and including resilient means in pressured engagement with said locating member to initiate such motion of the locating member as will tend to urge one of the detents into registry with one of the slots in the ring.

7. In a power indexing arrangement for use in association with a multiple tool holding device on a metal cutting machine, the combination of a slide, a power source on the slide, a timing gear connected to the source to be moved thereby, a spider member, a turret member, said members being independently rotatably mounted on the slide, said turret member being movable axially relative to said spider member, a power transmission system operatively connected to said members and to the device, locating elements on each of the members, a locating mechanism selectively and altenately engageable with the respective elements, means on the timing gear to operate said locating mechanism in response to movement of the device whereby the mechanism alternately engages the elements to alternately prevent movement of the respective members, and means operatively associated with the spider member to alternately clamp and unclamp the turret member is response to movement of the spider member, said transmission system being operative through said timing gear to successively move said spider member to initiate the unclamping of the turret member and then to move said turret member to index same and then to move the spider member to initiate reclamping of said turret member.

8. In a power indexing arrangement for use in association with a multiple turret holding device on a metal cutting machine, the combination of: a slide; a power source on the slide; a timing gear connected to the source to be moved thereby; a spider member, a turret member, said members being independently rotatably mounted on the slide, said turret member being movable axially relative to said spider member; a power transmission system operatively connected to said members and to the device, said transmission system comprising a sun gear mounted on the slide and in geared engagement with said timing gear, a planetary gear arrangement carried by the spider member and operatively connected to the sun gear, and a ring gear connected to the turret member and operatively engaged with said planetary gear arrangement; locating elements on each of the members; a locating mechanism selectively and alternately engageable with the respective elements; means on the timing gear to operate said locating mechanism in response to movement of the device whereby the mechanism alternately engages the elements to alternately prevent movement of the respective members; and means operatively associated with the spider member to alternately clamp and unclamp the turret member in response to movement of the spider member; said transmission system being operative through said timing gear to successively move said spider member to initiate the unclamping of the turret member and then to move said turret member to index same and then to move the spider member to initiate reclamping of said turret member.

9. In a power indexing arrangement for use in association with a multiple tool holding device on a metal cutting machine, the combination of: a slide; a power source on the slide; a timing gear connected to the source to be moved thereby; a spider member, a turret member, said members being independently rotatably mounted on the slide, said turret member being movable axially relative to said spider member; a power transmission system operatively connected to said members and to the device; locating elements on each of the members; a locating mechanism selectively and alternately engageable with the respective elements, said locating mechanism comprising locating rings, one of which is secured to the turret member and the other of which is secured to the spider member, a locating member linearly movable along a radial line, said locating member having spaced detents thereon alternately engageable with slots formed in the locating rings; means on the timing gear to operate said locating mechanism in response to movement of the device whereby the mechanism alternately engages the elements to alternately prevent movement of the respective members, said means comprising a cam presented by the timing gear to rotate therewith, and a follower on the locating member engaging the cam whereby the locating member is urged to move linearly in response to engagement of the follower with variable lands on the cam, to initiate the linear movement and the alternate engagement of the detents with the slots; and means operatively associated with the spider member to alternately clamp and unclamp the turret member in response to movement of the spider member; said transmission system being operative through said timing gear to successively move said spider member to initiate the unclamping of the turret member and then to move said turret member to index same and then to move the spider member to initiate reclamping of said turret member.

10. In a power indexing arrangement for use in association with a multiple tool holding device on a metal cutting machine, the combination of: a slide; a power source on the slide; a timing gear connected to the source to be moved thereby; a spider member, a turret member, said members being independently rotatably mounted on the slide, said turret member being movable axially relative to said spider member; a power transmission system operatively connected to said members and to the device; locating elements on each of the members; a locating mechanism selectively and alternately engageable with the respective elements; means on the timing gear to operate said locating mechanism in response to movement of the device whereby the mechanism alternately engages the elements to alternately prevent movement of the respective members; and means operatively associated with the spider member to alternately clamp and unclamp the turret member in response to movement of the spider member, said means comprising a cam arrangement which accommodates linear movement of the turret member; said transmission system being operative through said timing gear to successively move said spider member to initiate the unclamping of the turret member and then to move said turret member to index same and then to move the spider member to initiate reclamping of said turret member.

11. In a power indexing arrangement for use in association with a multiple tool holding device on a metal cutting machine, the combination of: a slide; a power source on the slide; a timing gear connected to the source to be moved thereby; a spider member, a turret member, said members being independently rotatably mounted on the slide, said turret member being movable axially relative to said spider member; a power transmission system operatively connected to said members and to the device; locating elements on each of the members; a locating mechanism selectively and alternately engageable with the respective elements; means on the timing gear to operate said locating mechanism in response to movement of the device whereby the mechanism alternately engages the elements to alternately prevent movement of the respective members; and means operatively associated with the spider member to alternately clamp and unclamp the turret member in response to movement of the spider member, said means comprising a fixed cam non-rotatably connected to the slide, a movable cam connected to the spider member to rotate therewith and abuttably engaging the turret member, said fixed cam and movable cam having high lands and low lands thereon whereby the turret is linearly moved to clamped position when the high lands of the movable cam are brought into registry with the high lands of the fixed cam, and the linear movement of the turret member to the unclamped position is accommodated when the high lands of the movable cam are brought into registry with the low lands of the fixed cam; said transmission system being operative through said timing gear to successively move said spider member to initiate the unclamping of the turret member and then to move said turret member to index same and then to move the spider member to initiate reclamping of said turret member.

12. A power indexing arrangement according to claim 2, and including means to accurately position said turret in said clamped position.

13. A power indexing arrangement according to claim 12, wherein said last mentioned means comprises at least one key on the turret member and a plurality of key receiving slots, said key and slots being registerable upon movement of the turret member to clamped position to accurately locate said turret member in said clamped position.

14. A power indexing arrangement according to claim 12, wherein said last mentioned means comprises a coupling member on the turret having a plurality of annularly disposed teeth on one face thereof, another coupling member on the base having a plurality of annularly disposed teeth on one face thereof, said teeth being operatively engageable upon movement of the turret member to clamped position.

References Cited in the file of this patent

UNITED STATES PATENTS

| | | |
|---|---|---|
| 1,644,222 | Baker | Oct. 4, 1922 |
| 1,690,568 | Bullard | Nov. 6, 1928 |
| 2,202,117 | Muller | May 28, 1940 |
| 2,384,809 | Bullard et al. | Sept. 18, 1945 |
| 2,740,307 | Wakefield | Apr. 3, 1956 |